United States Patent
Guata

(10) Patent No.: US 7,719,704 B1
(45) Date of Patent: May 18, 2010

(54) HANDLING DIFFERENT TYPES OF TELECOMMUNICATION SIGNALS

(75) Inventor: Haim Guata, Raanana (IL)

(73) Assignee: Veraz Networks Ltd., Petach-Tikva (IL)

( * ) Notice: Subject to any disclaimer, the term of this patent is extended or adjusted under 35 U.S.C. 154(b) by 696 days.

(21) Appl. No.: 10/019,558

(22) PCT Filed: Jun. 18, 2000

(86) PCT No.: PCT/IL00/00355

§ 371 (c)(1),
(2), (4) Date: Dec. 31, 2001

(87) PCT Pub. No.: WO01/03390

PCT Pub. Date: Jan. 11, 2001

(30) Foreign Application Priority Data

Jun. 30, 1999 (IL) .................................... 130711

(51) Int. Cl.
*G06F 3/12* (2006.01)
*H04N 1/00* (2006.01)

(52) U.S. Cl. ..................... 358/1.15; 358/435; 358/436

(58) Field of Classification Search ....... 358/1.11–1.18, 358/403, 407, 425, 434, 1.1, 1.9, 400, 401, 358/435, 436, 438, 439, 442, 447; 370/329, 370/336, 337, 339, 353, 355, 360
See application file for complete search history.

(56) References Cited

U.S. PATENT DOCUMENTS

| | | | | |
|---|---|---|---|---|
| 5,117,453 | A * | 5/1992 | Piasecki et al. | 379/100.17 |
| 5,440,564 | A * | 8/1995 | Ovadia et al. | 370/358 |
| 5,940,479 | A * | 8/1999 | Guy et al. | 379/93.01 |
| 6,112,084 | A * | 8/2000 | Sicher et al. | 370/337 |
| 6,112,085 | A * | 8/2000 | Garner et al. | 455/428 |
| 6,170,073 | B1 * | 1/2001 | Jarvinen et al. | 714/758 |
| 6,606,311 | B1 * | 8/2003 | Wang et al. | 370/338 |

FOREIGN PATENT DOCUMENTS

| | | |
|---|---|---|
| EP | 0 529 104 B1 | 7/1995 |
| EP | 0 494 687 B1 | 10/1996 |
| EP | 0 614 305 B1 | 12/1998 |

* cited by examiner

*Primary Examiner*—Thierry L Pham
(74) *Attorney, Agent, or Firm*—Browdy and Neimark, PLLC

(57) ABSTRACT

A digital telecommunication station is provided, operative in a telecommunication network to receive at least two different types of signals and divert signals of at least one of these types from the transmission path along which signals of the other types are transmitted.

14 Claims, 3 Drawing Sheets

HANDLING DIFFERENT TYPES OF TELECOMMUNICATION SIGNALS

FIELD OF THE INVENTION

The present invention relates to telecommunication systems in general, and in particular to the transmission of various types of signals in telecommunication systems.

BACKGROUND OF THE INVENTION

Different sorts of signals may be transmitted through telecommunication systems. Among these signals are voice signals, facsimile signals, data signals, video signals etc. Furthermore, in today networks, signals may also be classified by their quality, a characteristic that is used to differentiate between different quality of services.

Various types of telecommunication systems are known in the art and in the marketplace for interconnecting telephone communication trunks to a transmission network. One type of such systems is known as Digital Circuit Multiplication Equipment (to be referred to hereinafter as "DCME") systems.

In order to use network available resources as efficiently as possible, many solutions were suggested in the past. One such example is the use of optimal ADPCM algorithm in DCME systems, where this algorithm is adapted for transmission of compressed voiceband data. This solution allows achieving a typical compression rate of 2:1. However, when taking into account that the compression rate of the DSI and the ADPCM algorithms for speech is 6:1, it is understood why even such an improved algorithm presents a bottleneck in these systems. In the recent years, the use of facsimile machines is constantly growing, and since facsimile signals are transmitted via DCME systems when compressed as voiceband data, the overall compression rate that can be achieved for DCME systems approaches 3:1 ratio. When using more advanced encoding algorithms such as LD-CELP and CS-ACELP, higher compression rates may be achieved, as the typical overall compression rates are 8:1 and 16:1, respectively. Nevertheless, in view of the developing traffic load in telecommunication systems, there is constant striving for better utilization of the network resources available, which in turn will allow to reduce communication costs while maintaining required qualities of service.

Therefore, it is understandable why solutions for better utilization of resources both in TDM and non-TDM systems, such as IP systems, are to be found.

SUMMARY OF THE INVENTION

It is therefore an object of the present invention to provide a novel digital telecommunication station capable of transmitting various signals.

It is another object of the present invention to provide a digital communications system utilizing efficiently the resources available for communication transmissions by diverting less urgent signals based on their type, to another transmission path, thereby increasing the bandwidth available at the main transmission path for the transmission of more urgent signals.

Yet another object of the present invention is to provide a method for handling different types of communication traffic.

Further objects and features of the invention will become apparent to those skilled in the art, from the following description and the accompanying drawings.

In accordance with a first embodiment of the present invention there is provided a digital telecommunication station operative in a telecommunication network and comprising:

at least one detector operative to receive at least two different types of signals and determine their type;

at least one switch controlled by one of said at least one detector, operative to channel signals received in accordance with the determination made by said one of the at least one detector;

a first transmission means operative to transmit the received signals along a first transmission path, wherein signals of at least one type may be diverted from the first transmission path along which signals of the other types are transmitted; and a second transmission means operative to transmit the diverted signals of the at least one type along a second transmission path.

The term "telecommunication network", as will be used hereinafter, should be understood to encompass the various types of networks known in the art, such as TDM, synchronous and asynchronous transfer networks, IP networks, IP frame relaying networks and any other applicable communication networks.

The term "different types of signals" as used herein, should be understood to encompass both signals belonging to different groups of signals e.g. voice signals, facsimile signals, data signals, voiceband data signals and video signals, as well as signals of the same group having different quality, e.g. voice signals that are adapted to different Quality of Service ("QoS").

In accordance with the present invention, the telecommunication station is provided with a detector to determine the type of the signals received and a switch to channel these signals in accordance with their type. However, in some cases, the use of such a detector and a switch may be avoided when the transmission of signals of certain type(s), is received with a priori knowledge of their type. For example, when a pre-defined trunk is assigned only for delivering a specific type of signals, the fact that a call arrives via this trunk is enough for automatic recognition of the signals' type, and the following handling is carried out accordingly. The present invention should be understood also to encompass this mode of operation.

The process of diverting the signals may be considered as belonging to one of two main types of diversions that are encompassed by the present invention. The first type of diversion is achieved by delaying the diverted signals (e.g. by storing them in a buffer memory) and forwarding them along the first transmission path towards the receiving end at a later stage. The other type of diversion is carried out by transmitting the diverted signals along a different (second) transmission path, with or without delaying their transmission along that second transmission path.

One of the major advantages offered by the present invention is the enhancement of the network real time traffic performance as well as its capacity. Diverting part of the traffic carried along a bearer (the first transmission path), results in increasing bandwidth availability for e.g. transmitting additional voice calls, and consequently in the increase of the overall system performance.

According to yet another preferred embodiment of the invention, the second transmission path to which some of the signals are diverted, is a path defined in a packetized network such as an IP network and the like.

By yet another embodiment of the invention, the diversion of some of the signals is carried out in accordance with the quality of service required. For example, voice signals for which high quality of service is required will be transmitted along the first transmission path whereas signals, for which lower quality of service is required, are diverted to a second transmission path.

According to a preferred embodiment of the invention, the at least one detector of the digital telecommunication station is capable of detecting facsimile signals and classifying the signals received as selected facsimile signals that are distinguished from other signals. The selected facsimile signals may then be diverted (preferably in accordance with the bandwidth availability) from the first transmission path.

By another preferred embodiment of the invention, the digital telecommunication station further comprises means for encoding/decoding signals received, e.g. demodulating/re-modulating facsimile signals when such signals are received, allowing their transmission in their coded form, preferably along a second transmission path.

As would be appreciated by a person skilled in the art, demodulation and re-modulation may either be complete including, for example, de-scrambling and scrambling, or incomplete, not including scrambling and de-scrambling.

In accordance with yet another preferred embodiment of the invention the demodulating/re-modulating means comprises a plurality of facsimile demodulators, apparatus for initially supplying incoming selected facsimile signals simultaneously to the plurality of facsimile demodulators, apparatus for determining which of the plurality of facsimile demodulators initially successfully demodulates an incoming selected facsimile signal, and apparatus for utilizing the facsimile demodulator which initially successfully demodulates an incoming selected facsimile signal for continuing demodulation of the incoming selected facsimile signal. Alternatively, instead of applying a three step procedure namely, supplying incoming selected facsimile signals to all demodulators, determining which of these demodulators will be used for demodulating the remaining of the transmission and utilizing that demodulator for demodulating the transmission, a two step procedure may be applied. For this alternative, each of the plurality of demodulators is capable of demodulating any type of facsimile transmission to be used is based primarily on the basis of availability. Once an available demodulator is selected, it is used for demodulating the transmission.

Additionally, in accordance with another preferred embodiment of the invention the demodulating/re-modulating device comprises facsimile signal demodulator/re-modulator and forward error correction apparatus wherein the forward error correction apparatus is operative to protect the output of the facsimile demodulator.

In accordance with yet another embodiment, the digital telecommunication station of the present invention further comprises:

first identifier for determining whether the signals received are in a digital compressed form;

second identifier for determining whether the transmission path along which the signals will be transmitted includes at least one further operative means adapted for decompressing the signals when being transmitted in their compressed form;

third transmission means operative in response to a determination made by the second identifier that the transmission path does not include at least one further operative means adapted for decompressing the signals being transmitted in their compressed form; and fourth transmission means operative in response to a determination made by the second identifier that the transmission path does include at least one further operative means adapted for decompressing the signals being transmitted in their compressed form into the decompressed digital output signals.

The digital telecommunication station described above, allows operation in a mode where signals that are received by the station already in their coded form are not decompressed when at least one further de-compressor, capable of decompressing these signals transmitted in their compressed form, is operative along the transmission path. Naturally there may be cases where the first transmission path further comprises operative means that are capable of decompressing the compressed signals, whereas the second transmission path does not comprise such further means, or vice a versa. In these cases, the coded signals that should be transmitted along a transmission path that has no such further decompressing means, will be decompressed to their non-compressed form by the station's decompressing device prior to their transmittal.

In accordance with yet another aspect of the invention, there is provided a telecommunication system comprising at least one transmission apparatus at least a first end of the transmission network and at least one receiving apparatus at least a second end of the transmission network. The telecommunication system further comprises at least one digital telecommunication station of the type described above.

In accordance with still another preferred embodiment of the invention, a pair of telecommunication stations in the communication system is selectively operated.

By a further embodiment of the present invention at least one of the digital telecommunication stations in the digital communication system is further provided with an option of establishing a communication connection with more than two other digital telecommunication stations. Preferably, such a station is adapted to establish a communication with a plurality of digital telecommunication stations each located at a different part of a telecommunication network. By another embodiment of the present invention, all or part of the transmissions transmitted by a digital telecommunication station, is received in parallel by at least two other digital telecommunication stations.

According to another aspect of the present invention there is provided a method for transmission of telecommunication signals of at least two different types, the method comprising:

A method for transmission of telecommunication signals of at least two different types, the method comprising:

i) determining the type of signals received and distinguishing therefrom signals of at least one pre-defined type from signals of other types;

ii) based on step i), diverting signals of a pre-defined type from a first transmission path along which signals of the other types are transmitted;

iii) transmitting the signals of the other types along the first transmission path; and iv) transmitting the diverted signals along a second transmission path.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
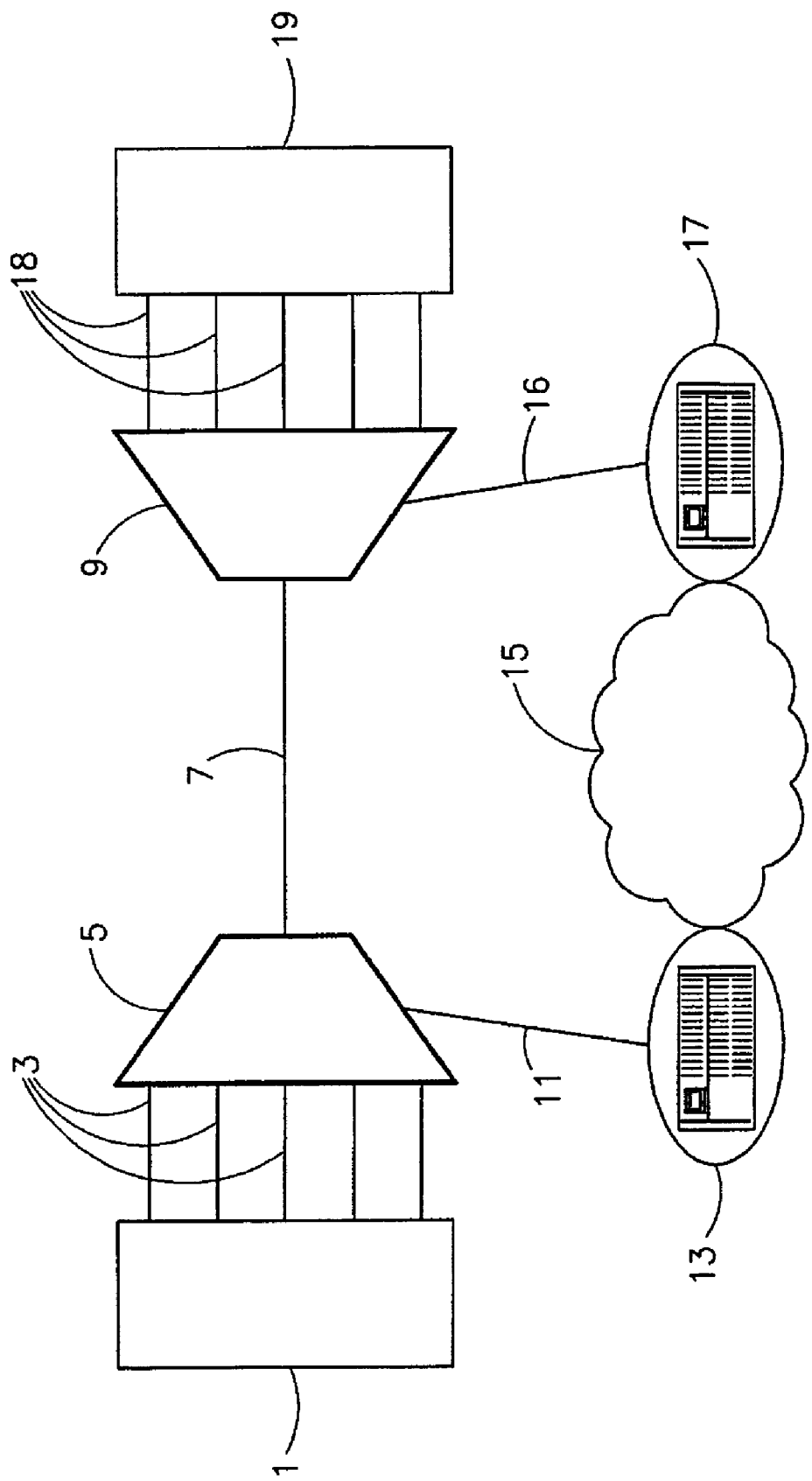
FIG. 1 is a schematic illustration of an embodiment in accordance with the present invention.

A system illustrating an embodiment of the present invention is shown in FIG. 1. Signals of various types are transmitted to telecommunication switch 1 and therefrom over a plurality of trunks 3 to telecommunication station 5. According to this embodiment, a detector (not shown in the Fig.) detects the type of the signals received and a switch (also not shown in this Fig.) controlled by this detector, diverts these signals in accordance with a pre-defined mode of operation. An example of such pre-defined mode of operation is that as long as there is enough available bandwidth for transmission, signals of all types will be transmitted along bearer 7. However, at times when an increase in the traffic load above a certain threshold, signals of certain type(s) e.g. facsimile signals, will not be transmitted along bearer 7. In this case, if a signal is of a voice type, it will be processed by station 5 and be forwarded along bearer 7 (the first transmission path). When the signal is of a non-fax voiceband data type signal, again, the signal may be processed by station 5 and be forwarded along bearer 7, preferably depending on the bandwidth availability. However, when a facsimile call arrives at station 5, the station's switch diverts the call to communication link 11. The voice and non-fax voiceband signals received at station 9 are decoded and transmitted over trunks 18 towards switch 19. The diverted facsimile signals are forwarded via communication link 11 and via IP Gateway 13, towards IP network 15. The diverted facsimile signals are then transmitted over an IP path defined in network 15 towards gateway 17. In gateway 17, the arriving facsimile call is directed to station 9 where it is channeled in accordance with the original assignment of trunks 18, to switch 19, and therefrom to its destination. It should also be understood that in accordance with a preferred embodiment of the present invention, the diverted facsimile signals should not necessarily be transmitted via station 9. A different path can be applied, as long as the diverted signals can be managed and controlled by the network so that they reach successfully their final destination.

Figure 2:
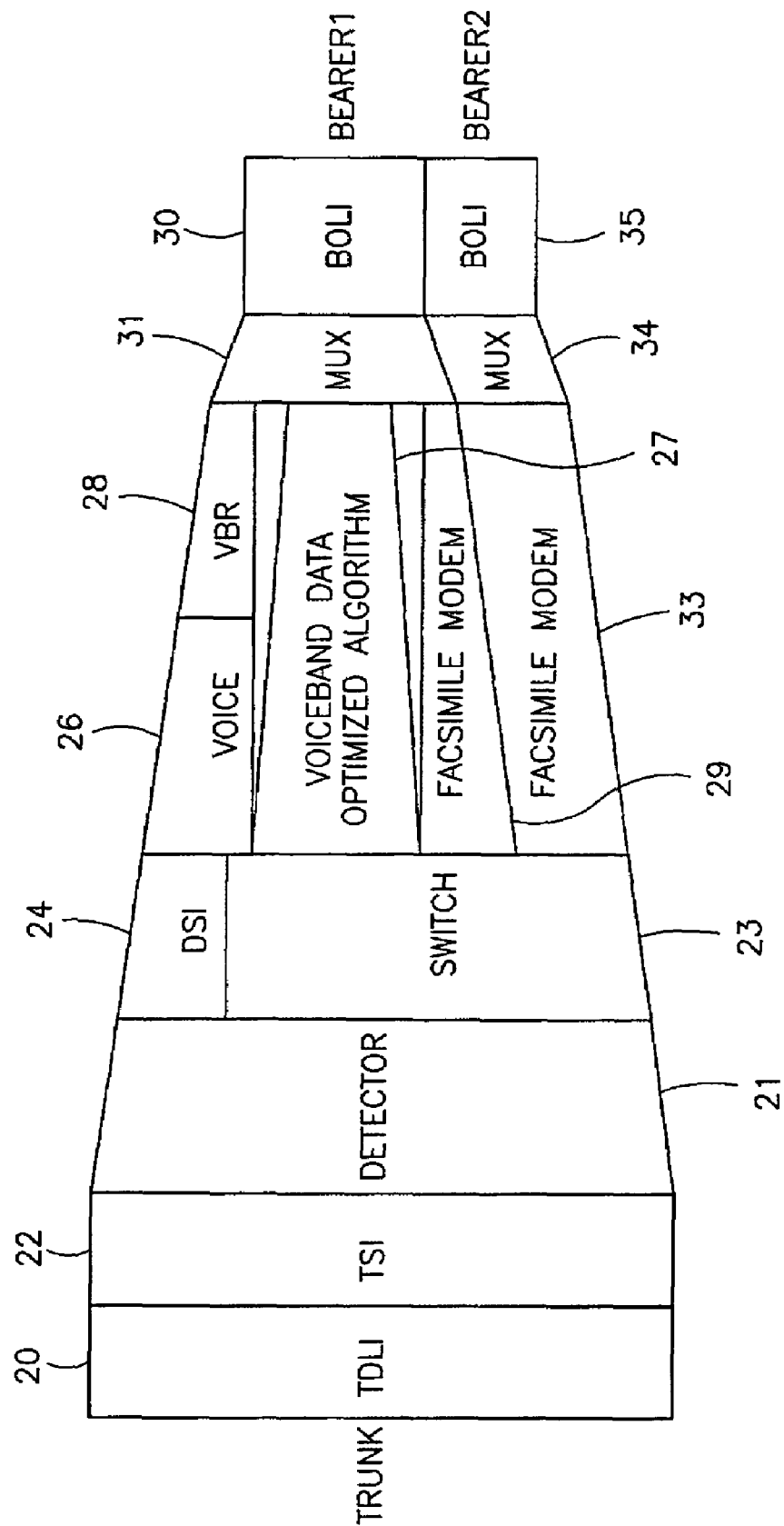
FIG. 2 is a functional block diagram illustration of the transmit side of a system operative in accordance with a preferred embodiment of the present invention.

Reference is now made to FIG. 2, which is a functional block diagram of a telecommunication station. The transmit side is described with respect to FIG. 2. The receive side is of a mirror symmetric description and will not be described herein. Many of the components of the telecommunication system are substantially similar to those described and claimed in the aforesaid U.S. Pat. No. 4,171,096, which is incorporated herein by reference, and therefore, will not be described in detail. It will be appreciated that the telecommunication system described in FIG. 2 can be implemented in a point to point configuration, in a multiclique configuration, and in a multi-destination configuration, as defined in ITU-T Recommendation G.763. Additionally, it can be implemented as an access terminal for traffic compression into a packet switching network.

The transmission apparatus includes a trunk PCM interface (TDLI) 20 which is operative to provide interfacing between 1.544 Mbit/s or 2.048 Mbit/s PCM signals and the internal 2.048 Mbit/s (NRZ) signals employed in the telecommunication system. It is operative to provide synchronization plesiochronous buffering and optional format conversion.

Downstream of TDLI 20 there is provided a time slot interchange (TSI) 22, which provides time slot mapping. It enables up to ten 24-channel bit stream to be regrouped into eight 30/32 channel bit streams.

Digital speech interpolation circuitry (DSI) 24 provides voice compression by means of the time assignment speech interpolation (TASI) e.g. of U.S. Pat. No. 4,523,309.

Detector 21 provides detection circuitry for classifying incoming signals as selected signals of a pre-defined type(s), such as facsimile signals, and as other signals. Other signals typically include speech, tone and non-facsimile voiceband data. In accordance with this detecting operation, switch 23 channels the signals in accordance with their type. This enables the transmission apparatus to separately compress facsimile signals and transmit them along a second transmission path and to apply the conventional compression techniques for speech and non-facsimile voiceband data signals, and transmit them along a first transmission path.

Further compression is provided by a signal compression circuit typically comprised of a speech compressing circuitry 26, e.g. Adaptive Differential Pulse Code Modulation (AD-PCM) circuitry, LD-CELP circuitry, CS-ACELP circuitry and the like, and Variable Bit Rate (VBR) circuitry 28, voiceband data optimized algorithm circuitry 27 and optionally facsimile modem 29. Facsimile modem 29 may be included mainly to retain the option of transmitting facsimile signals along with the other types of signals when there is enough bandwidth available.

Speech compressing circuitry 26 may employ an ADPCM algorithm, in accordance with ITU-T Recommendation G.726, LD-CELP algorithm in accordance with ITU-T Recommendation G.728, CS-ACELP algorithm in accordance with ITU-T Recommendation G.729 and similar ones for compressing speech. VBR circuitry 28 is typically provided in conjunction with ADPCM 26 and is operative to effectively create additional bearer channels (in excess of 62) to overcome periods of traffic overload, as described in aforesaid U.S. Pat. No. 4,747,096. The ADPCM 26 and the VBR 28, in conjunction with the DSI 24, provide a compression ratio of typically 6:1 for speech signals.

Voiceband data is routed through voiceband data optimized algorithm 27 which employs ADPCM codecs optimized for reliable transmission of voiceband data, as described in aforesaid U.S. Pat. No. 4,747,096. It will be appreciated that the voiceband data compression may be implemented using other algorithms, such as that of ITU-T Recommendation G. 726.

In accordance with a preferred embodiment of the present invention, facsimile signals are channeled by switch 23 to facsimile modem 33 provided for reproducing a plurality of original facsimile binary data from a plurality of PCM signals, for optionally incorporating error correction information into the plurality of original facsimile binary data and for multiplixing the resultant signals. The optional error correction function is typically provided when the transmission network is of the type where performance is degraded. From previous explanations it should be clear that the device designated as facsimile modem 33 is not necessarily used to demodulate facsimile signals, and to be used as a means to transfer the diverted facsimile signals to the second transmission path without operating thereon.

Multiplexer 34 multiplexes the output of facsimile modem 33 into a plurality of time slots of up to 2.048 or 1.544 Mbit/s signal.

Multiplexer 31 multiplexes the output of the signal compression stage, comprising speech compressing algorithm 26, VBR 28, voiceband data algorithm 27 and facsimile modem 29 (if applicable) into a plurality of time slots of up to 2.048 or 1.544 Mbit/s signal.

An alternative embodiment of the invention comprises a multiplexer 31 which incorporates wideband packet technology, as described in the aforementioned paper by R. W. Muise et al entitled "Experiments in Wideband Packet Technology" presented at the International Zurich Seminar on Digital Communication, April 1986. In the alternative embodiment, multiplexer 31 is operative to act as a Packet Assembler (PA) to gather and packetize a sequence of samples of compressed speech, voiceband data or facsimile data (when applicable) and to subsequently transmit the packets to a transmission network.

Interface between the 2.048 Mbit/s output of multiplexer 31 to the standard 1.544/2.048 Mbit/s standard PCM bearer channels is provided by the Bearer PCM Interface (BDLI) 30, described in aforesaid U.S. Pat. No. 4,747,096. Similarly, a further BLDI 35 is provided to allow facsimile transmission via a different transmission path.

Figure 3:
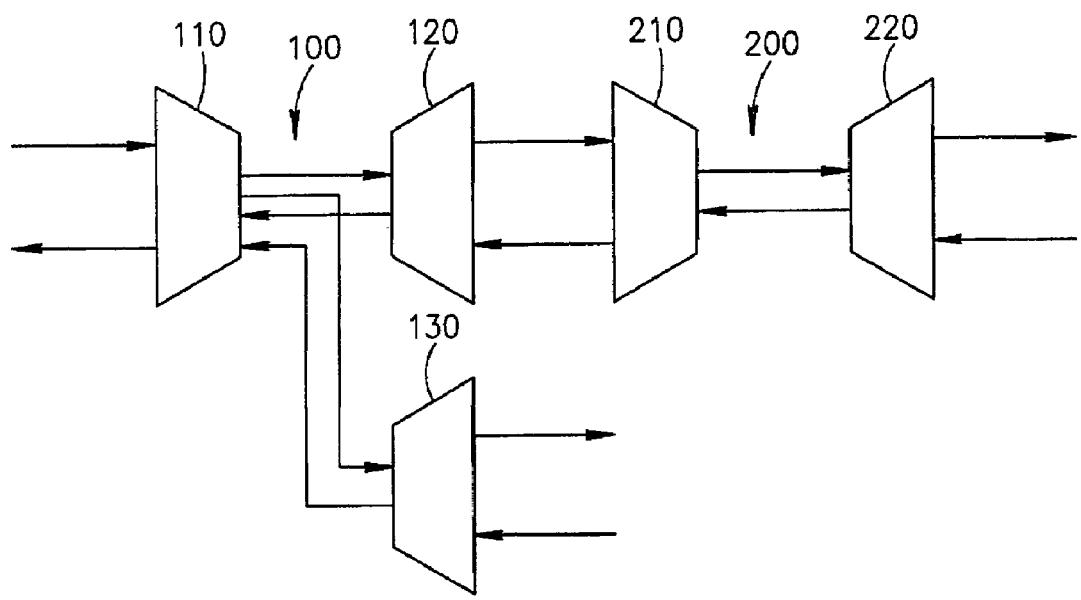
FIG. 3 illustrates communication links between various telecommunication stations.

Another embodiment of the present invention is illustrated in FIG. 3. In accordance with this embodiment a telecommunication station (in this example station 110) may communicate with more than one corresponding telecommunication station. In this Figure, station 110 is illustrated as having an option to communicate with both stations 120 and 130. As should be appreciated by a man skilled in the art, this embodiment may be implemented in a variety of ways. One example of such implementation, is that each of the stations may communicate with any other corresponding station, each located at a different end of an IP net, where voice calls are directed to station 120 and fax calls to station 130. Another applicable example is that a station may communicate simultaneously with at least two corresponding stations. Further types of digital telecommunications stations operating in tandem are also possible and it should be understood that they are all encompassed by the present invention.

Let us now turn to FIG. 3 in which two pairs of telecommunication stations, namely, 100 and 200 are presented. Each one of these two pairs of stations comprises one station operating as a compressor (110 and 210, respectively) and its counter de-compressor (120 and 220 respectively). A typical operation of these stations is as follows. A transmission is received at station 110 operating as a compressor. The facsimile signals are diverted to station 130 whereas the rest of the transmission is compressed and sent to station 120 operating as a de-compressor. Once identification means of station 120 determine the existence of another operative pair of telecommunications stations (200), e.g. by detecting identification signal(s) transmitted by station 210, the mode of operation known as end-to-end compression mode is established, and the transmission will be forwarded from station 120 to station 210 in its compressed form. The transmission thus received at station 210 is further transmitted to de-compressor 220, for decompression. The facsimile signals may for example be transmitted in their demodulated form to station 210 as long as the parameters of the calls can be retrieved, e.g. keeping track after these parameters by using an outband system such as one operating in a compatible SS7 network.

When the transmission direction is reversed, the transmission arriving is compressed by station 220, now operating as a compressor, and sent to station 210. The latter station, identifying the existence of a further operative pair of stations (100), now downstream of the transmission path, will transmit the information received in its compressed mode. The compressed information will then be transmitted by device 110 operating now as the compressing device in the pair (100) of stations, to the now de-compressed device 110, where it will be decompressed.

A similar process, mutatis mutandis, may be followed when different qualities of services are to be provided for the different calls reaching the telecommunication station. Such differentiation may be required depending on the type of service the transmission is directed to. For example, when video signals are received as data they may be treated differently (to have higher quality) then data signals that are transmitted in email transmissions. In such a case the email data signals will be diverted from the first transmission path and the video transmission will be carried out at higher quality.

Figure 4:
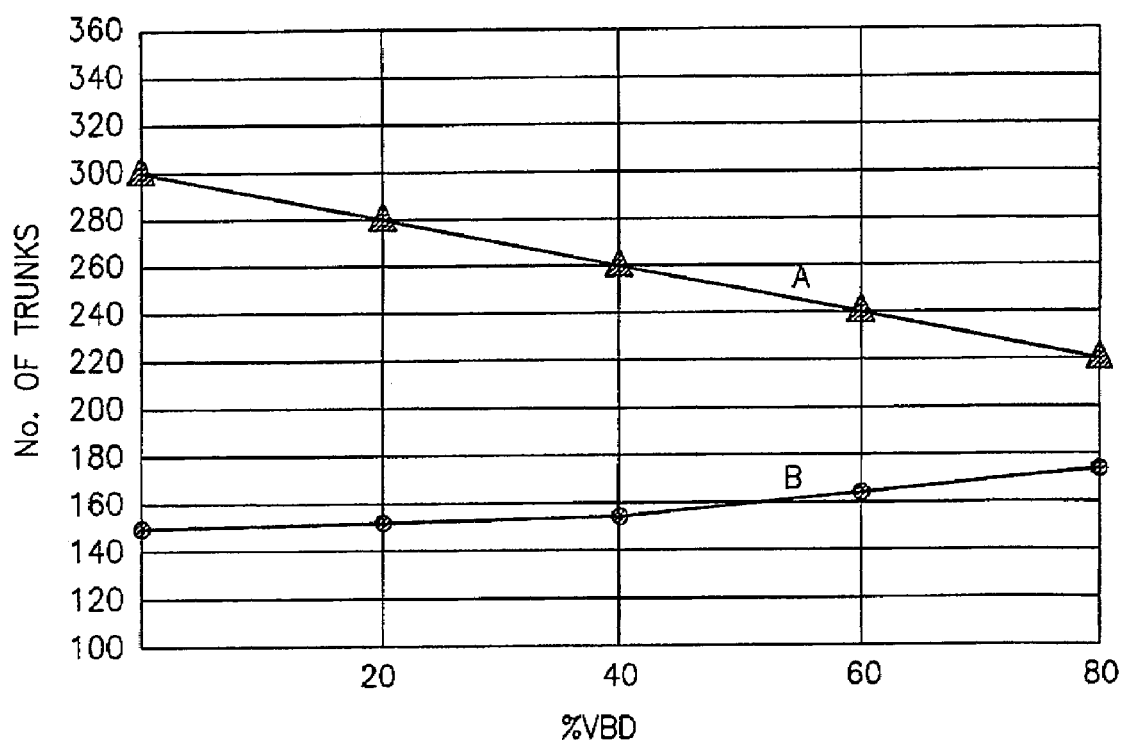
FIG. 4 shows changes in the performance of a telecommunication station of the present invention when operating under various loads of voice, facsimile and voiceband data traffic.

In recent years, enhanced voice compression capabilities are being used, such as by using the LD-CELP and CS-ACELP compressing algorithms. However facsimile traffic, which demonstrates an increase in transmission over DCME systems, mainly during business traffic period and during lower tariff time of the day, has a negative effect upon the DCME systems. When such a system can achieve 10:1 gain when voice calls are transmitted, this gain is decreased to about 6: for facsimile calls. FIG. 4 illustrates typical system gain as a function of various combinations of voice, fax and voiceband data ("VBD") traffic.

The set of conditions chosen as a basis for the performance presented in this Figure are: bearer bandwidth—2 Mbit/s; Fax—90% of VBD; Fax TX %—75% of fax transmissions; Non-fax VBD—40 kbit/s FDX; Average Bit Per Sample (ABPS)—1.88 for LD-CELP and 3.7 for ADPCM; and freeze out—<0.1%. Curve a presents a system using the LD-CELP speech compressing algorithm (based on ITU-T Recommendation G.728) whereas curve b presents a system using ADPCM algorithm (based on ITU-T Recommendations G.763 and G.766). As can be seen in this Figure, in case of 40% VBD calls, out of which about 90% are actually facsimile calls, the system achieves gain of 263 trunk channels compressed to 31 time slots, demonstrating an average gain of 8.48:1, where 95 trunks are used for carrying facsimile calls. When these facsimile calls are diverted as suggested by the present invention to IP bearer, the average gain is increased to 9.8:1 whereas 3 additional trunks will used to carry facsimile traffic.

This type of operation allows the major part of the TDM network bandwidth to be assigned for voice transmission which is sensitive to delay, variations in delay periods as will as loss of data, while other traffic such as facsimile transmissions, less sensitive to delays, is transferred to the IP network.

It is to be understood that the above description only includes some embodiments of the invention and serves for its illustration. Numerous other ways of managing various types of compressed signals in telecommunication networks may be devised by a person skilled in the art without departing from the scope of the invention, and are thus encompassed by the present invention.

The invention claimed is:

1. A digital telecommunication station operative in a telecommunication network, the network comprising at least two different transmission paths between said telecommunication station and at least one other element in the network, each path comprising a different link between said telecommunication station and the at least one other element in the network, the telecommunication station comprising:

at least one detector operative to receive at least two different types of signals, each associated with a different class of quality of service and to distinguish, for each received signal in its entirety, the type of signal to which it belongs;

at least one switch controlled by one of said at least one detector, operative to channel signals received in accordance with the distinction made by said at least one detector;

a first transmission means operative to transmit received signals along a first one of said at least two different transmission paths, wherein, responsive to the channeling by said at least one switch, signals of at least one other type selected from among said at least two different types of signals and associated with a lower class of quality of service are diverted from the first transmission path; and a second transmission means operative to transmit the diverted signals along a second one of said at least two different transmission paths.

2. A digital telecommunication station according to claim 1, further comprising a storage capable of storing diverted signals of said at least one type of signals.

3. A digital telecommunication station according to claim 1, further comprising at least two different pairs of compressing/decompressing devices.

4. A digital telecommunication station according to claim 1, wherein said signals of the at least one type to be diverted are facsimile signals.

5. A digital telecommunication station according to claim 4, further comprising a device for demodulating/re-modulating said facsimile signals.

6. A digital telecommunication station according to claim 5, wherein said demodulating/re-modulating device comprises facsimile signal demodulator/re-modulator and forward error correction apparatus wherein the forward error correction apparatus is operative to protect the output of the facsimile demodulator.

7. A digital telecommunication station according to claim 3 and further comprising:

first identifier for determining whether the signals received are of a digital compressed form;

second identifier for determining whether the transmission path along which the signals will be transmitted includes at least one further operative means adapted for decompressing the signals when being transmitted in their compressed form;

third transmission means operative in response to a determination made by the second identifier that the transmission path does not include at least one further operative means configured to decompress the signals when being transmitted in their compressed form; and fourth transmission means operative in response to a determination made by the second identifier that the transmission path does include at least one further operative means configured to decompress the signals being transmitted in their compressed form into the decompressed digital output signals.

8. A telecommunication system comprising:
at least one transmitter at least a first end of the transmission network;
at least one receiver at least a second end of the transmission network; and
at least one digital telecommunication station of claim 1.

9. A telecommunication system comprising:
at least one transmitter at least a first end of the transmission network;
at least one receiver at least a second end of the transmission network; and
at least one pair of digital telecommunication stations of claim 3.

10. A telecommunication system according to claim 9, wherein at least one pair of telecommunication stations is selectively operated.

11. A telecommunication system according to claim 8, wherein said at least one of digital telecommunication station is capable of establishing a communication connection with more than two digital communication stations.

12. A method for transmission of telecommunication signals of at least two different types each associated with a different class of quality of service between a telecommunication station and at least one other element in a network along at least two transmission paths, the transmission paths each comprising a link between the telecommunication station and the at least one other element, the method comprising:

i) determining to which of a plurality of types of signals each of the signals received belongs and distinguishing therefrom signals associated with at least one class of quality of service different from entire signals associated with at least one other class of quality of service;

ii) based on step i), diverting each entire signal associated with said at least one class of quality of service from a first one of the transmission paths along which each entire signal associated with at least one other class of quality of service is transmitted;

iii) transmitting the each entire signal of the at least one other class of quality of service along the first one of the transmission paths; and iv) transmitting each entire diverted signal along a second one of the transmission paths.

13. A method according to claim 12, wherein the diverted signals are stored and transmitted at a later stage via said first one of the transmission paths.

14. A method according to claim 13, wherein the diverted signals are stored in a storage means prior to their transmittal along the second one of the transmission paths.

* * * * *